United States Patent

Domberg et al.

[11] Patent Number: 6,057,619
[45] Date of Patent: May 2, 2000

[54] STRESS RELIEF IN A MAGNETIC THRUST BEARING

[75] Inventors: Daniel Domberg, Machesney Park; Shin Katsumata, Rockford, both of Ill.

[73] Assignee: Sundstrand Corporation, Rockford, Ill.

[21] Appl. No.: 09/219,215

[22] Filed: Dec. 22, 1998

[51] Int. Cl.[7] .................................................. F16C 39/06
[52] U.S. Cl. ......................... 310/90.5; 310/90; 384/100; 384/102
[58] Field of Search ................... 310/90.5, 90; 384/100, 384/102, 114

[56] References Cited

U.S. PATENT DOCUMENTS

| | | | |
|---|---|---|---|
| 3,947,153 | 3/1976 | Matthias et al. | 417/356 |
| 4,538,081 | 8/1985 | Kamiya et al. | 310/90 |
| 4,805,972 | 2/1989 | Tanaka et al. | 359/200 |
| 4,920,291 | 4/1990 | McSparran | 310/90.5 |
| 4,935,654 | 6/1990 | Glass et al. | 310/90.5 |
| 5,019,738 | 5/1991 | Weilbach et al. | 310/90.5 |
| 5,153,475 | 10/1992 | McSparran | 310/254 |
| 5,354,179 | 10/1994 | Maruyama et al. | 417/42 |
| 5,355,040 | 10/1994 | New | 310/90.5 |
| 5,483,570 | 1/1996 | Renshaw et al. | 378/132 |
| 5,675,201 | 10/1997 | Komura et al. | 310/90.5 |
| 5,705,869 | 1/1998 | Kliman et al. | 310/90.5 |
| 5,881,598 | 3/1999 | Sapuppo et al. | 74/5.65 |

*Primary Examiner*—Nestor Ramirez
*Assistant Examiner*—Thanh Lam
*Attorney, Agent, or Firm*—Wood, Phillips, VanSanten, Clark & Mortimer

[57] ABSTRACT

Undesirably high stresses are minimized in a magnetic thrust bearing (15) having a disc (52) mounted on a shaft (54). The disc (52) is flanked on both sides (60,62) by respective armatures (68,70) which act to apply a magnetic field to the disc (52) to locate the same at a desired location along the axis (66) of the rotor (14) of the machine in which the thrust bearing (15) is employed. A peripheral, radially outwardly opening, annular groove (76) is disposed in the outer periphery (64) of the thrust bearing disc (52) to relieve stresses during operation.

10 Claims, 2 Drawing Sheets

STRESS RELIEF IN A MAGNETIC THRUST BEARING

FIELD OF THE INVENTION

This invention relates to magnetic thrust bearings, and more particularly, to the relief of stress in magnetic thrust bearings employed in high speed rotary machines. The invention is particularly applicable to thrust bearings employed in high speed dynamoelectric machines.

BACKGROUND OF THE INVENTION

Many high speed rotary machines, such as dynamoelectric machines or turbines, employ thrust bearings to control or counteract thrust applied to the rotary components of such machines along the axis of rotation of their rotary parts. Conventional thrust bearings rely upon contact between relatively moving parts to absorb such forces.

However, as the angular velocity at the surface of the rotating element increases, either as a result of increased rotational velocity, increased diameter of the journalled element, or both, it is desirable to have a dry bearing with no contacting parts to minimize or eliminate inefficiencies in operation. As rotational speeds increase, it is desirable to have a dry bearing with no contacting parts to remove inefficiencies in operation.

To eliminate or otherwise minimize the losses caused by such efficiencies, resort has been had to magnetic thrust bearings. As is well known, magnetic thrust bearings typically employ a disc made of ferromagnetic material that is connected to the rotary part of the machine to rotate therewith. A pair of armatures, one on each side of the disc, generate a controlled magnetic field for the purpose of centering the disc between the armatures without actually contacting the armatures. That is to say, the disc is spaced from the armatures by small air gaps, and thus, the only friction involved is so-called "windage" at the air gaps.

Location sensors in the machine determine the axial position of the rotary component and through conventional control circuitry, provide controlled electrical power to the two armatures to attain the desired magnetic fields.

Such magnetic bearings work well for their intended purpose. However, since by their very nature, they are well suited for use in high speed applications, high stresses exist during operation of the machine in the magnetic thrust bearing disc. Should such stresses reach levels of sufficient magnitude as to cause partial or total failure of the magnetic thrust bearing, failure, even catastrophic failure, of the high speed machine with which the thrust bearing is used may result to minimize the stress the prior art has resorted to so-called "stepped rotor" configurations. However, this often results in a reduction in the magnetic force available to achieve separation of relatively rotating components. This in turn may require the use of larger magnetic bearings, adding weight and volume to the machine. It may also increase power requirements for powering the magnets of the bearings.

The present invention is directed to reducing stresses in magnetic thrust bearings used in such high speed rotary machines.

SUMMARY OF THE INVENTION

It is the principal object of the invention to provide a new and improved magnetic thrust bearing. More specifically, it is an object of the invention to provide such a thrust bearing wherein its construction minimizes stress within the thrust bearing disc during operation of the machine with which the magnetic thrust bearing is used. It is also an object of the invention to improve the utilization of magnetic forces generated by the bearing magnets, allowing a reduction in bearing size and/or magnet power requirements.

An exemplary embodiment achieves the foregoing objects in a magnetic thrust bearing assembly adapted to accommodate axial forces applied to a rotatable body journalled for rotation about an axis. The magnetic thrust bearing includes a shaft rotatable about the axis and a disc of magnetic material on the shaft and having a periphery that is a surface of revolution concentric with the axis together with opposed sides extending from the periphery to the shaft with the sides having a radial component. First and second armature assemblies are disposed about the shaft and face a respective one of the opposed sides and a continuous, peripheral, radially outwardly opening groove is located in the periphery. The groove serves to remove material from the disc adjacent its periphery with the consequence that stresses resulting from centrifugal force during high speed rotation of the disc are relieved by the absence of material in the disc without a reduction in the magnetic force generated in the bearing for separation purposes, thereby requiring a larger bearing and/or increased bearing power requirements. The groove also interferes with magnetic leakage to provide more efficient utilization of magnetic forces in maintaining the separation of the relatively rotating components.

In a preferred embodiment, the groove is centered between the opposed sides.

In one embodiment, the disc includes internal passages extending from at least one of the opposed sides at a location radially inward of the groove to the groove. The passages serve, during rotation of the disc, as pump passages for centrifugally pumping a cooling fluid, such as air, through the thrust bearing for cooling purposes.

In a highly preferred embodiment, the groove is generally U-shaped in cross-section.

In a highly preferred embodiment of the invention, the magnetic bearing is employed in a high speed rotary machine which includes a rotor journalled about an axis. The shaft may form part of the rotor.

In an even more preferred embodiment of the invention, the high speed rotary machine is a dynamoelectric machine that includes a stator with electrical windings on the stator. The rotor is journalled for rotation about an axis within the stator and a magnetic thrust bearing for the rotor is provided. It includes a disc of magnetic material connected to the rotor and having a periphery in the form of a surface of revolution concentric with the axis. Armatures flank the disc for applying magnetic forces to the disc to position the same at a desired location along the axis and stress relieving means are disposed in the periphery of the disc and include an annular, generally radially outwardly opening, peripheral groove in the periphery.

Other objects and advantages will become apparent from the following specification taken in connection with the accompanying drawings.

DESCRIPTION OF THE PREFERRED EMBODIMENT

Figure 1:
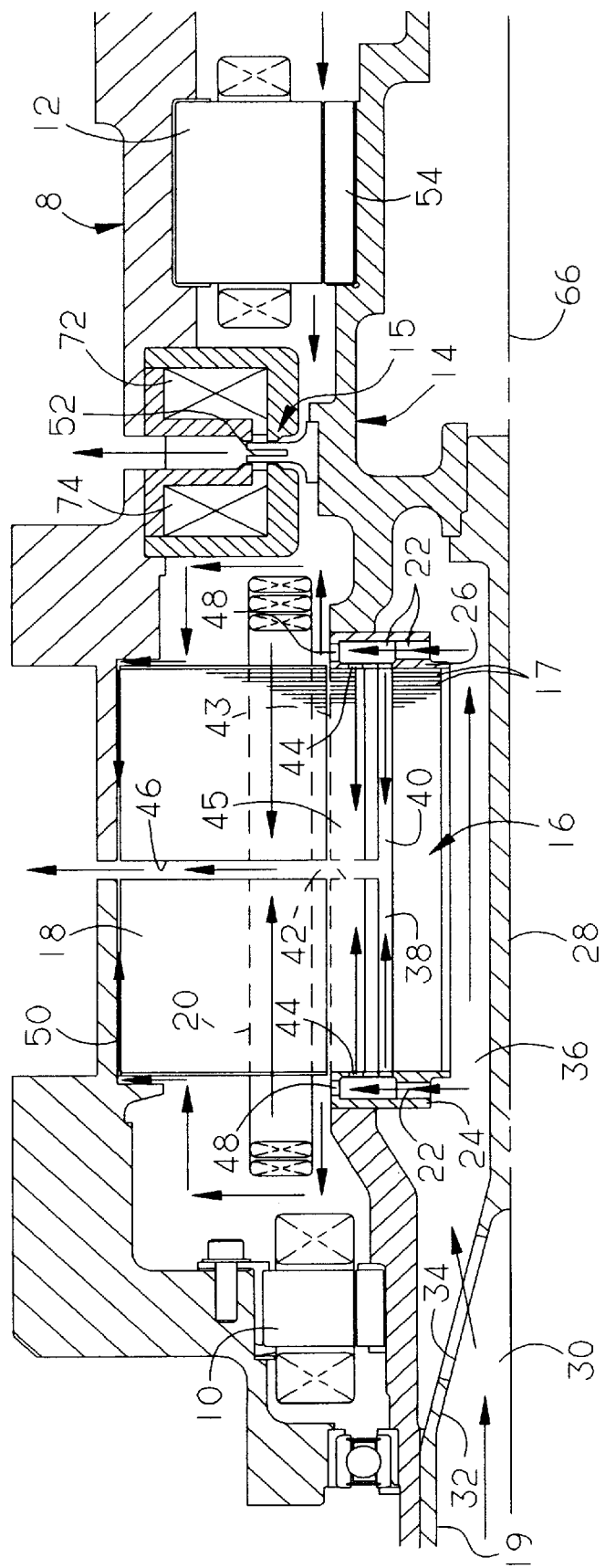
FIG. 1 is a somewhat schematic, partial sectional view of a high speed rotary machine, in which a magnetic thrust bearing made according to the invention may be employed.

An exemplary embodiment of the invention is illustrated in the drawings and will be described in the environment of a dynamoelectric machine. However, it is to be understood that the invention is not limited to such machines, but may be employed with efficacy in any type of high speed rotary machine having a shaft or rotary body subject to axial forces. The invention will also be described in the context of an air cooled machine but again, it should be recognized that the invention may be employed with efficacy in electrical machines that are cooled with other fluids as well.

Referring to FIG. 1, a dynamoelectric machine made according to the invention is seen to include a housing, generally designated 8 which mounts conventional, magnetic journal bearings 10 and 12 which journal a rotor, generally designated 14. The specific dynamoelectric machine is intended to operate as a generator and to this end, may be coupled to a source of rotary power such as a gas turbine, not shown. To provide for axial loads placed on the rotor 14 by its source of motive power, a magnetic thrust bearing, generally designated 15, is also included.

The rotor 14 includes a stack 16 of thin laminations 17 made of a ferromagnetic material and which is journalled by the magnetic bearings 10, 12 for rotation within a stator 18 having windings 20. Pumping vanes 22 are located at opposite ends of the stack 16 which, in turn, is held in assembled relation by clamp surfaces 24, 26 forming part of the rotor 14. A tie bolt 28 extending between the clamp surfaces 24, 26 provides the requisite clamping force.

The left-hand end 29 of the tie bolt 28 is enlarged and includes an interior chamber 30. A necked down section 32 of the tie bolt extending from the enlarged end 29 includes a series of openings 34 (only one of which is shown) through which air from the chamber 30 may pass into the interior of the machine. The lamination stack 16 includes an interior, annular passage 36 extending about the tie bolt 28 and cooling air is drawn in through the chamber 30 to be directed to the vanes 22 on the left-hand side of the machine as viewed in FIG. 1 with additional air passing through the annular passage 36 to the vanes 22 at the right-hand side of the stack 16.

Axial passages 38 and 40 in the laminations 17 forming the stack 16 which are generally, but not always, located between the poles (not shown in FIG. 1) of the rotor 16, receive air from the vanes 22 and discharge it through radially outwardly opening bores 42 to the air gap 43 between the rotor 16 and the stator 18. In addition, openings 44 in the end pieces of the rotor 14 allow the flow of air to recesses 45 between the rotor poles on the lamination stack 16. This air also flows to the center of the lamination stack 16.

At least one radially extending discharge bore 46 is centrally located in the stator 16 and the cooling air passing through the passages 38 and 40 and in the recesses 45 can be discharged to the exterior of the housing 8 via the bore 46.

Openings 48 located on the rotor 14 radially outward of the openings 44 and the vanes 22 allow some air to be discharged along the sides of the stator 18 to cool the end turns of the windings 20. The windings 20 in turn are spaced from one another and allow air flow through the stator 18 to the passages 46 for ultimate discharge through the exterior of the housing 8. In addition, the back iron 50 of the stator 18 may be spaced from the housing 8 or channeled so as to allow air that has passed through the end turns of the winding 20 to flow along the back iron 50 in the space between the same and the housing 8 to the bore 46 for discharge.

Some air is permitted to pass on the left-hand side of a thrust disc 52 of the thrust bearing 15 to be ejected from the housing, cooling the disc 52 and the left-hand magnet of the thrust bearing 15. In this regard, the thrust disc 52, even though smooth-sided, acts as a pump for pumping such air.

It is also to be noted that some air is permitted to leak between various ones of the rotating components and the stationary components of the magnetic bearing 12 to provide cooling in that area. Air may be drawn in by the thrust disc 52 from the right-hand side of the structure and passes between the rotary component 54 of the magnetic journal bearing 12 to pass radially outwardly along the right-hand side of the thrust disc 52 to be ejected while cooling the right-hand magnet and the right side of the thrust disc 52 of the magnetic thrust bearing 15.

Figure 2:
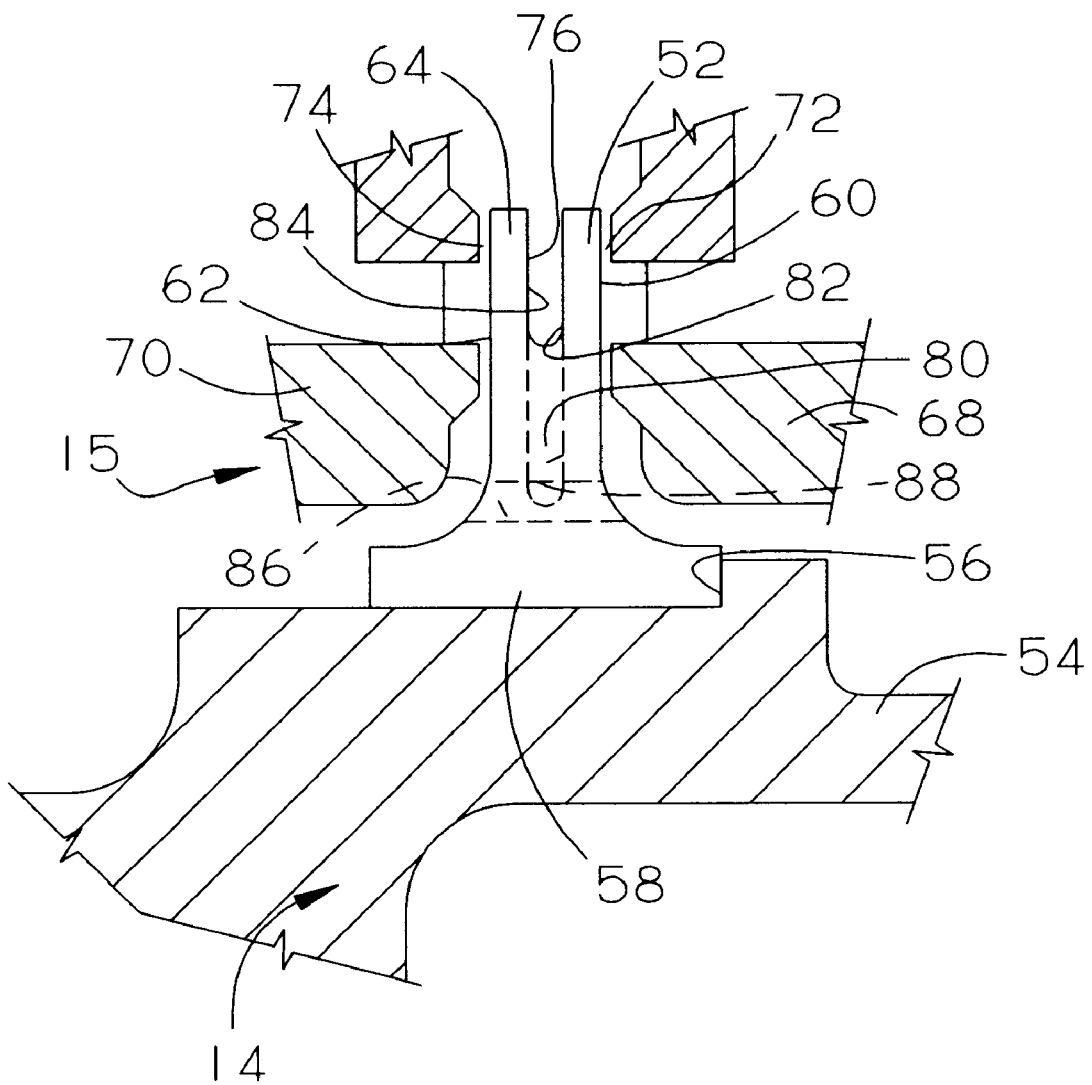
FIG. 2 is an enlarged, partial section of the magnetic thrust bearing.

Turning now to FIG. 2, the thrust bearing 15 will be explained in greater detail. The rotor 14 includes a hollow, shaft-like segment 54 including a step 56. The disc 52 has an axially enlarged hub 58 which is abutted against the step 56. The disc 52 may be held against the step 56 by any conventional means.

In the direction radially outwardly of the hub 58, the disc 52, which is formed of magnetic material, includes opposed, parallel sides 60 and 62. The sides 60 and 62 are generally smooth sided and need not always be parallel, but will always have a considerable radial extent.

The sides 62 terminate at an outer peripheral surface 64 which is a surface of revolution which is concentric with the rotational axis 66 (FIG. 1) of the rotor 14. In the illustrated embodiment, the surface of revolution defining the periphery 64 is that of a cylinder, but other configurations could be employed.

Adjacent to the side 60, a right side magnetic armature 68 is located. A second armature or left side magnetic armature 70 is located adjacent the surface 62. The armatures 68 and 70 are of conventional construction and include electrical windings 72, 74, respectively (FIG. 1) which receive electrical current from a control circuit (not shown) of conventional construction which in turn is operated by a position sensor (not shown) that determines the axial position of the rotor 14 in relation to some desired position. The armatures 68 and 70 conventionally generate a magnetic field through which the disc 52 rotates. The magnetic forces serve to place the disc 52, and thus the rotor 14 connected thereto, in the desired location which, of course, is out of contact with either of the armatures 68, 70. That is, air gaps 72, 74 will exist between the sides 60, 62 and the respective armatures 68 and 70.

In order to minimize stress within the disc 62 caused by centrifugal forces during operation of the machine, the same is provided with a peripheral, radially outwardly opening, annular groove 76 which is centered between the sides 60 and 62. The groove 76 is peripheral in the sense that it extends a full 360° about the disc 52 and preferably is U-shaped in configuration so as to have a round 80 where the interior sides 82, 84 of the groove 76 joint. This prevents the generation of stresses at this location as well.

Quite unexpectedly, the groove 76 actually improves magnetic force utilization as well, thus enabling the use of smaller magnetic bearings and/or reducing the power requirements of the magnetic armatures 68 and 70. In magnetic bearings without the groove 76, a magnetic leakage path exists across the disc 52 from one armature 68 or 70 to the other armature 70 or 68. The groove 76 interrupts this magnetic leakage path at the periphery of the disc 52 and lengthens it substantially by requiring the leakage flux to flow within the disc 52 all the way around the groove 76. This longer path adds substantial resistance to magnetic flux leakage, thereby reducing it substantially. That in turn means that the magnetic force available to achieve separation of the relatively rotating components is increased by the amount of the reduction in magnetic leakage. The ultimate result is that the bearing, now with greater magnetic separation force available, may be reduced in size or by supplied with lesser electrical power or both.

Where it is desired that the thrust bearing 15 act to pump a coolant such as air, through the machine, in some instances, it may be desirable to add internal pumping configurations to the disc 52 rather than rely solely on the pumping that occurs as a result of windage along the smooth sides 60, 62 of the disc 52.

To this end, plural, equally angularly spaced, generally axially directed bores 86 are located in the hub 56 or just radially outwardly thereof. The bores 86 are generally parallel to the rotational axis 66 (FIG. 1) of the rotor 14 and may open to one or the other or both of the sides 60, 62. In the illustrated embodiment, the bores 86 open to both sides.

An equal number of equally angularly spaced, radially directed bores 88 interconnect the rounded bottom 80 of the groove 76 and an associated one of the bores 86. As a result, the bores 86, 88 serve as a centrifugal pump to draw cooling air through the machine in which the thrust bearing 15 is used and expel the air outwardly through the annular groove 76, cooling the thrust disc 52 in the process.

If it is desired to draw cooling air from only one side of the machine or the other, the bore 86 need not open to the side of the machine from which coolant is not to be drawn.

From the foregoing, it will be appreciated that a magnetic thrust bearing made according to the invention is ideally suited for use in high speed applications in that stresses generated within the magnetic thrust disc 52 during operation are minimized primarily by the presence of the groove 76 therein. The reduction in stress is greater than is found in stepped rotor configurations, and it occurs with no resulting loss in magnetic force generation as is seen in the stepped rotor configurations. Consequently, the chances of failure of the thrust bearing disc 52 are substantially reduced allowing the attainment of high rotational speeds without fear of disc failure.

In addition, the thrust bearing 15 may also serve as a pump for a cooling fluid as well.

Finally, the invention achieves more efficient utilization of the magnetic forces in maintaining the separation of the relatively rotating components thereby enabling a reduction in bearing size and/or magnet power requirements.

We claim:

1. In a high speed dynamoelectric machine the combination of
    a stator;
    electrical windings on said stator;
    a rotor journalled for rotation about an axis for rotation within said stator; and
    a magnetic thrust bearing for accommodation of forces applied to said rotor along said axis and including a disc of magnetic material connected to said rotor and having a periphery in the form of a surface of revolution concentric with said axis; armatures flanking said disc for applying magnetic forces to said disc to position the same at a desired location along said axis; and
    stress relieving means in said periphery including an annular, generally radially outwardly opening, peripheral groove.

2. The high speed dynamoelectric machine of claim 1 wherein said groove is generally U-shaped in cross-section.

3. In a high speed rotary machine, the combination of:
    a rotor journalled for rotation about an axis; and
    a magnetic thrust bearing for accommodation of forces applied to said rotor along said axis and including a disc of magnetic material connected to said rotor and having a periphery in the form of a surface of revolution concentric with said axis; armatures flanking said disc for applying magnetic forces to said disc to position the same at a desired location along said axis; and
    stress relieving means in said periphery including an annular, generally radially outwardly opening, peripheral groove.

4. A magnetic thrust bearing for accommodation of axial forces applied to a rotatable body journalled for rotation about an axis, comprising:
    a shaft rotatable about said axis;
    disc of magnetic material on said shaft and having a periphery that is a surface of revolution concentric with said axis and opposed sides extending from said periphery to said shaft with said sides having a radial component;
    first and second armature assemblies about said shaft and facing a respective one of said opposed sides; and
    a continuous, peripheral, radially outwardly opening groove in said periphery.

5. The magnetic thrust bearing of claim 4 wherein said groove is centered between said sides.

6. The magnetic thrust bearing of claim 4 wherein said disc includes internal passages extending from at least one of said opposed sides at a location radially inward of said groove to said groove.

7. In a high speed dynamoelectric machine the combination of
    a stator;
    electrical windings on said stator;
    a rotor journalled for rotation about an axis for rotation within said stator, and
    a magnetic thrust bearing for accommodation of forces applied to said rotor along said axis and including a disc of magnetic material connected to said rotor and having a periphery in the form of a surface of revolution concentric with said axis; armatures flanking said disc for applying magnetic forces to said disc to position the same at a desired location along said axis; and
    magnetic leakage path interrupting means including an annular, generally radially outwardly opening groove in said periphery.

8. The high speed dynamoelectric machine of claim 7 wherein said groove is generally U-shaped in cross-section.

9. The high speed dynamoelectric machine of claim 7 wherein said groove is a peripheral groove.

10. In a high speed rotary machine, the combination of:
    a rotor journalled for rotation about an axis; and
    a magnetic thrust bearing for accommodation of forces applied to said rotor along said axis and including a disc of magnetic material connected to said rotor and having a periphery in the form of a surface of revolution concentric with said axis; armatures flanking said disc for applying magnetic forces to said disc to position the same at a desired location along said axis; and
    magnetic leakage path interrupting means in said periphery including an annular, generally radially outwardly opening, peripheral groove in said periphery.

* * * * *

UNITED STATES PATENT AND TRADEMARK OFFICE
CERTIFICATE OF CORRECTION

| | |
|---|---|
| PATENT NO. | : 6,057,619 |
| DATED | : May 2, 2000 |
| INVENTOR(S) | : Daniel Domberg and Shin Katsumata |

It is certified that error appears in the above-identified patent and that said Letters Patent is hereby corrected as shown below:

Column 1,
Line 11, insert the following:
-- This invention was made with government support under Contract No.: F33615-95-C-2509 with the United States Air Force. The government therefore has certain rights in this invention. --.

Signed and Sealed this

Thirty-first Day of January, 2006

JON W. DUDAS
*Director of the United States Patent and Trademark Office*